United States Patent
Brickell

(10) Patent No.: US 6,834,112 B1
(45) Date of Patent: Dec. 21, 2004

(54) SECURE DISTRIBUTION OF PRIVATE KEYS TO MULTIPLE CLIENTS

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/553,950

(22) Filed: Apr. 21, 2000

(51) Int. Cl.[7] .............................. H04L 9/00; H04L 9/32
(52) U.S. Cl. ..................... 380/279; 380/29; 713/183; 713/202
(58) Field of Search ..................... 713/182, 183, 713/202, 171; 380/277–279, 281–282, 29

(56) References Cited

U.S. PATENT DOCUMENTS

| | | | | |
|---|---|---|---|---|
| 5,497,421 A | * | 3/1996 | Kaufman et al. | ............ 713/156 |
| 5,892,828 A | * | 4/1999 | Perlman | ...................... 713/183 |
| 6,230,269 B1 | * | 5/2001 | Spies et al. | .................. 713/182 |
| 6,233,341 B1 | * | 5/2001 | Riggins | ....................... 380/277 |
| 6,370,250 B1 | * | 4/2002 | Stein | .......................... 380/281 |

OTHER PUBLICATIONS

Kaufman, Perlman, Speciner, Network Security Private Communication in a PUBLIC World, 1995, Prentice Hall PTR, p. 433–38, 443–47.*

Schneier, B., Applied Cryptography, 1996, John Wiley & Sons, Second Edition, p. 31–34; 442–45.*

* cited by examiner

*Primary Examiner*—Gilberto Barrón
*Assistant Examiner*—Minh Dinh
(74) *Attorney, Agent, or Firm*—Steven P. Skabrat

(57) ABSTRACT

A private key may be securely distributed to a user of a remote client computer over an insecure channel. The user's private key is transmitted to the client from a remote server in an encrypted format. A first hash of the user's password is transmitted to the remote server and is used to authenticate the user. A second hash of the user's password remains with the client computer and is used to decrypt the user's private key. The user only has to remember one login name and a single associated password. Thus, the private key can be securely distributed from the remote server to the client computer system. The distribution does not require the user to carry any special hardware devices and only requires a single password. Because the private key is not permanently stored at the client computers, even if an unauthorized user has access to the client computers, they are not likely to be able to obtain the private key. Similarly, because the remote server only has access to an encrypted version of the private key, and because the remote server does not store and has no way of uncovering the user's password, the remote server, even if broken in to, is not likely to compromise the user's private key.

32 Claims, 4 Drawing Sheets

SECURE DISTRIBUTION OF PRIVATE KEYS TO MULTIPLE CLIENTS

BACKGROUND OF THE INVENTION

1. Field of the Invention

The present invention relates generally to public key cryptographic systems, and more specifically, to the management of private keys in a public key cryptographic system.

2. Description of Related Art

The increasing accessibility of public networks, such as the Internet, allow a wide variety of data to be quickly and cost effectively accessed from virtually anywhere. The Internet, for example, allows users to access databases such as web page servers from any computer connected to the Internet.

One disadvantage with using a public network or an insecure private network to access information is the possibility that sensitive or private information may be accessed, modified, or intercepted by an unauthorized party. These problems can be overcome, however, by using public key cryptographic systems. An authorized person can digitally sign messages to verify their source and information can be encrypted before it is transmitted over the insecure network. The receiver of the signed message will be assured that the message originated from the authorized person. The encrypted information, even if unlawfully intercepted, is not intelligible. In this manner, an insecure network may act functionally like a private and secure network.

Public key cryptographic systems provide digital signatures and encryption. The basic components of a public key cryptographic system include a cryptographic algorithm and two numerical codes called keys, one of which is referred to as the public key and the other the private key. For digital signatures, the private key (or private signature key) is used to sign messages and the public key (or public verification key) is used to verify that the message was signed by the private key. For encryption, information encrypted with the public key (or public encryption key) can only be decrypted with the private key (or private decryption key). For example, if a first user encrypts a message with the public key, only the holder of the private key can recover the original message. Even the first user, absent the private key, cannot decrypt the message.

Parties wishing to securely communicate with one another over an insecure network using a public key cryptographic system begin by exchanging their public keys or by receiving digital certificates that associate a public key with an individual party. It is common practice to use a different private/public key pair for encryption than for digital signatures. Information that is to be transmitted to the other party is first signed using the sending parties private signature key and then encrypted using the other parties public encryption key.

For a public key cryptographic system to be secure, the communicating parties must keep their respective private keys secure. This can be problematic if the party wishes to engage in secure communications using public key cryptography from multiple computers. For example, consider the situation in which patient records stored at a central database are distributed to authorized doctors over an insecure network. If the doctor wishes to access patient records from a number of different computer terminals (e.g., from a terminal at each of a plurality of clinics she regularly visits), the doctor's private key must somehow be accessible by each of the computer terminals.

One way to provide the doctor's private key at each of the computer terminals is to simply store a copy of the private key at each terminal. Copying the private key to each terminal, however, may be inconvenient. Additionally, storing copies of the doctor's private key at multiple terminals, even if the private key is itself encrypted using a symmetric key encryption algorithm (i.e., an encryption algorithm in which the encryption/decryption is performed based on a single key or password), undesirably increases the exposure of the private key.

One possible solution to the problem introduced by needing access to a private key at multiple computer terminals is to store the private key at a remote database, and send an encrypted version of the private key in response to the login name sent by the user. The private key, which was encrypted using a symmetric encryption algorithm using the user's password as the key, is then decrypted at the terminal. This solution, however, as with storing a copy of the private key locally at each terminal, undesirably exposes the encrypted version of the private key. In particular, anyone with the user's login name can request the encrypted version of the key from the remote database. The encrypted version of the private key, once received by an illicit party, may then be vulnerable to a brute force attack, particularly if the user does not use a strong password.

Accordingly, there is a need in the art to more effectively distribute private keys in an insecure network.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

As described herein, a user may sign or decrypt messages from multiple different client computers. For each different client computer, the user's private key is provided from a key server to the user in an encrypted format. A first hash of the user's password is used to authenticate the user and a second hash of the user's password is used to decrypt the user's private key. The user only has to remember one login name and a single associated password.

Figure 1:
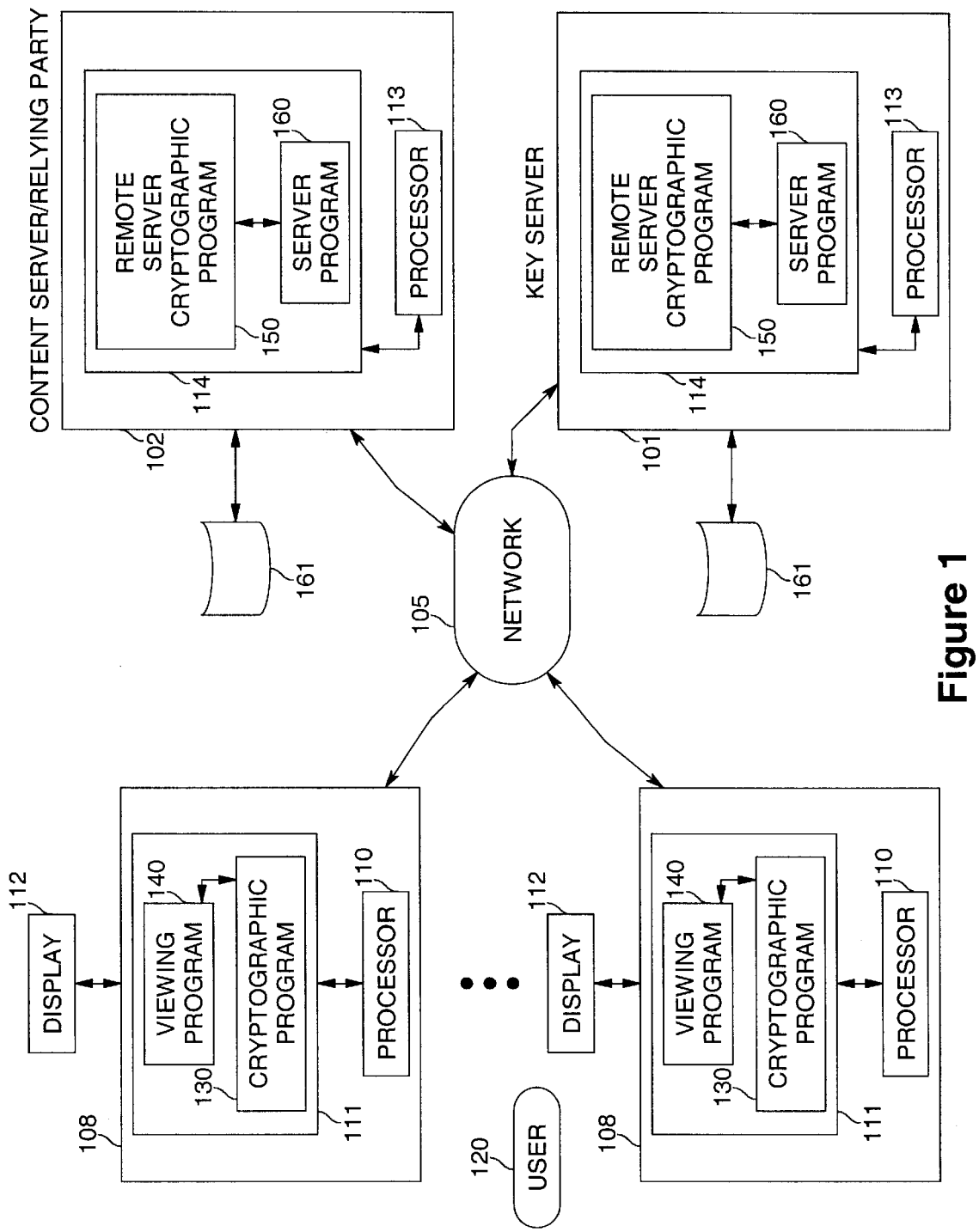
FIG. 1 a diagram illustrating an exemplary computer network on which concepts consistent with the present invention may be implemented.

FIG. 1 is a diagram illustrating an exemplary computer network in which concepts consistent with the present invention may be implemented. The computer network includes multiple client computers 108 coupled to network 105, which may be, for example, the Internet. Client computers 108 each typically include a processor 110 operatively coupled to computer memory 111 and a display 112. Processor 110 executes program instructions stored in computer memory 111, such as cryptographic program 130 or viewing program 140.

User 120 may use any of client computers 108 to communicate with key server 101 or content server/relying party 102. In general, key server 101 assists user 120 in managing the user's public and private key pairs. Content server 102 may be a web site wishing to provide encrypted information to user 120, or more simply, any party that wishes to rely on the authenticity of information received from user 120. Information retrieved from content server/relying party 102 is rendered by viewing program 140 and displayed to user 120 via display 112. Viewing programs 140 may be, for example, web browser programs such as Microsoft Internet Explorer, available from Microsoft Corporation, of Redmond, Wash.

Client cryptographic program 130, which is described in more detail below, encrypts, decrypts, and/or digitally signs information being transmitted to and received from key server computer 101 or content server/relying party 102. More particularly, client cryptographic program 130 decrypts information from key server 101 or content server/relying party 102 and provides it to viewing program 140 for display to user 120. Client cryptographic program 130 may also encrypt and/or digitally sign information entered by user 120 before transmitting it to key server 101 or content server/relying party 102. Although shown as a separate program from viewer program 140, cryptographic program 130 and viewing program 140 may be integrated as a single program. Moreover, although shown as a single program, cryptographic program 130 may be a multitude of cryptographic programs, each providing part of the functionality of cryptographic program 130.

Client computers 108, by virtue of their connection to network 105, may send information or may access and retrieve information stored at key server 101 or content server 102. Key server 101 and content server/relying party 102 are computers, or networks of computers, specifically designed to accept information requests from client computers 108 and to transmit requested content to the client computers or to accept and verify digitally signed messages from client computers 108. As with client computers 108, key server 101 and content server 102 includes at least one processor 113 and a computer memory 114. Memory 114 includes remote server cryptographic program 150, which interfaces with client computer cryptographic programs 130. Additionally, a server program 160 may interact with database 161 to respond to information requests from the client computers. Server program 160 may be a web server program such as any one of a number of well known web servers, such as the Apache web server; the Netscape server, available from Netscape Communications Corporation, of Mountain View, Calif.; or the Microsoft Internet Information Server, available from Microsoft Corporation, of Redmond, Wash. Alternatively, server program 160 may transmit information to client computers 108 in a proprietary, non web page format.

Client computers 108, key server 101, and content server 102 may either accept program instructions from a computer storage device (e.g., optical or magnetic disk) or from network 105. BIOS code (i.e., computer instructions) causing the system to implement the disclosed techniques may be programmed into a non-volatile portion of computer memories 111 and 114. The BIOS may be programmed when the system is manufactured or may be later delivered via a computer readable medium.

Client processors 110 and server processors 113 can be any of a number of well known computer systems, such as processors from Intel Corporation, of Santa Clara, Calif. More generally, client computers 108 may be any type of computing platform connected to a network and that interact with application programs, such as a personal digital assistant or a "smart" cellular telephone or pager.

Figure 2:
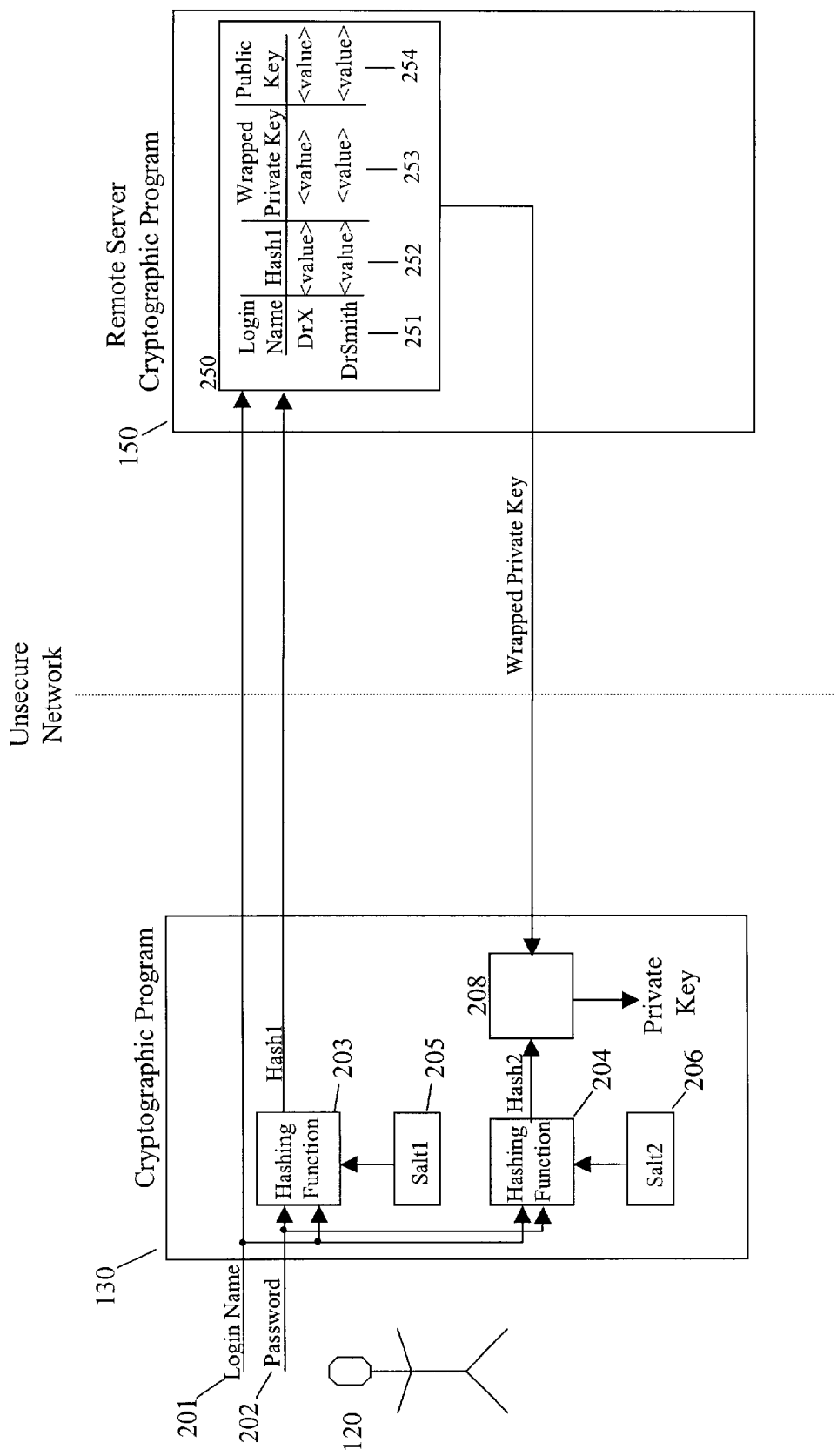
FIG. 2 is a block diagram functionally illustrating the interaction of the client cryptographic program and the key server cryptographic program.
Figure 3:
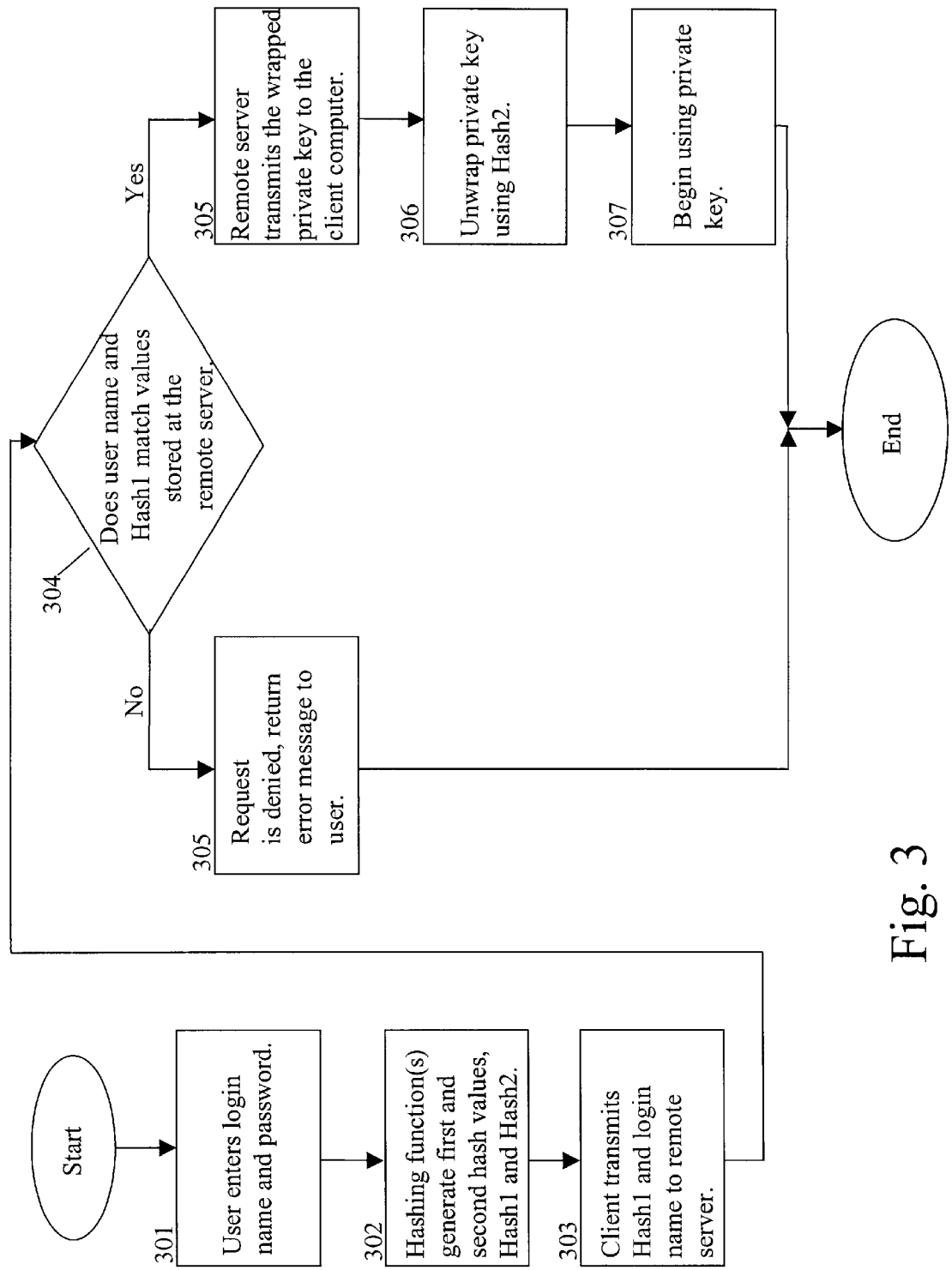
FIGS. 3 and 4 flow charts illustrating methods consistent with the present invention.

Remote server cryptographic program 150, as will be described in more detail below, stores an encrypted version of the user's private key. Cryptographic program 130 and remote server cryptographic program 150 operate together to securely transfer the user's private key to the user. FIGS. 2 and 3 illustrate this secure transfer of the user's private key.

FIG. 2 is a diagram functionally illustrating the operation of encryption program 130 and remote server encryption program 150 in providing a private key from the remote server to the user. FIG. 3 is a flow chart showing a corresponding method for transmitting a private key to the user.

User 120 begins by inputting a login name 201 and a password 202. (Act 301 in FIG. 3). Cryptographic programs 130 each contain two random numbers 205 and 206, called Salt1 and Salt2, respectively. Salt1 205 and Salt2 206 are identical across the cryptographic programs 130 stored at each of client computers 108. Salt1 205, password 202, and optionally, login name 201 are input to a first hashing algorithm 203. Similarly, Salt2 206, password 202, and optionally, login name 201 are input to a second hashing algorithm 204. Based on these inputs, first and second hashing algorithms 203 and 204 generate first and second hash codes (labeled "Hash1" and "Hash2," respectively). (Act 302).

The first and second hashing functions 203 and 204 may implement different mathematical hashing functions or the same hashing function. One suitable hashing algorithm for the first and second hashing functions 203 and 204 is the 160 bit SHA hashing algorithm. For any input string, SHA generates a 160 bit output value. The SHA hashing algorithm is well known in the cryptographic art. The hashing functions 203 and 204 may repeat the hashing algorithm multiple times in order to increase the difficulty of a brute force attack on the passwords. One suitable method for repeating SHA multiple times is with the PKCS # 5 algorithm, available from RSA, Inc., of Bedford, Mass.

In general, hashing algorithms take arbitrary strings as input, and produce an output of fixed size that is dependent on the input. Ideally, it should never be possible to derive the input data given the hash algorithm's output. For a hashing algorithm to be cryptographically secure, such as the SHA algorithm, it must be very difficult to find two input strings that produce the same output hash value, or to find an input string that produces a given hash value.

Because Salt1 and Salt2 are different values, hashing algorithms 203 and 204 will necessarily operate on different input strings and thus their output values, Hash1 and Hash2, will be, to a statistical certainty, different from one another.

Key server cryptographic program 150 includes a pre-stored table 250. As shown in FIG. 2, table 250 includes entries relating: the login names of the possible users of the key server (entry 251), the first hash value (Hash1) associated with each of these login names (entry 252), the wrapped user's private key (entry 253), and the user's public key (entry 254) (optional).

Key server cryptographic program 150 authenticates the user by matching the transmitted login name and Hash1 to the corresponding values in table 250 (i.e., entries 251 and 252). If the values match, the user is assumed to be the user specified by the login name, and the user's wrapped private key (entry 253) is transmitted back to the user. (Acts 304, 305). If the values do not match, an error message is returned to the user. (Acts 304, 306).

The wrapped private key, when received by client cryptographic program 130, is unwrapped using Hash2 as the key to symmetric decryption algorithm 208. (Act 306). Symmetric decryption algorithm 208 is the same algorithm used to initially wrap the private key, such as the DES algorithm. With the private key in hand, cryptographic program 130 may now use the private key for any cryptographic operation that requires the private key. If the private key is a digital signature key, the cryptographic program 130 could now sign messages with the private key. (Act 307). If the private key is a decryption key, the cryptographic program 130 could now decrypt messages that were encrypted with the corresponding public encryption key (Act 307). The private key may be used, for example, to sign messages sent to content server/relying party 102 or to encrypt messages sent to the content server/relying party 102.

Figure 4:
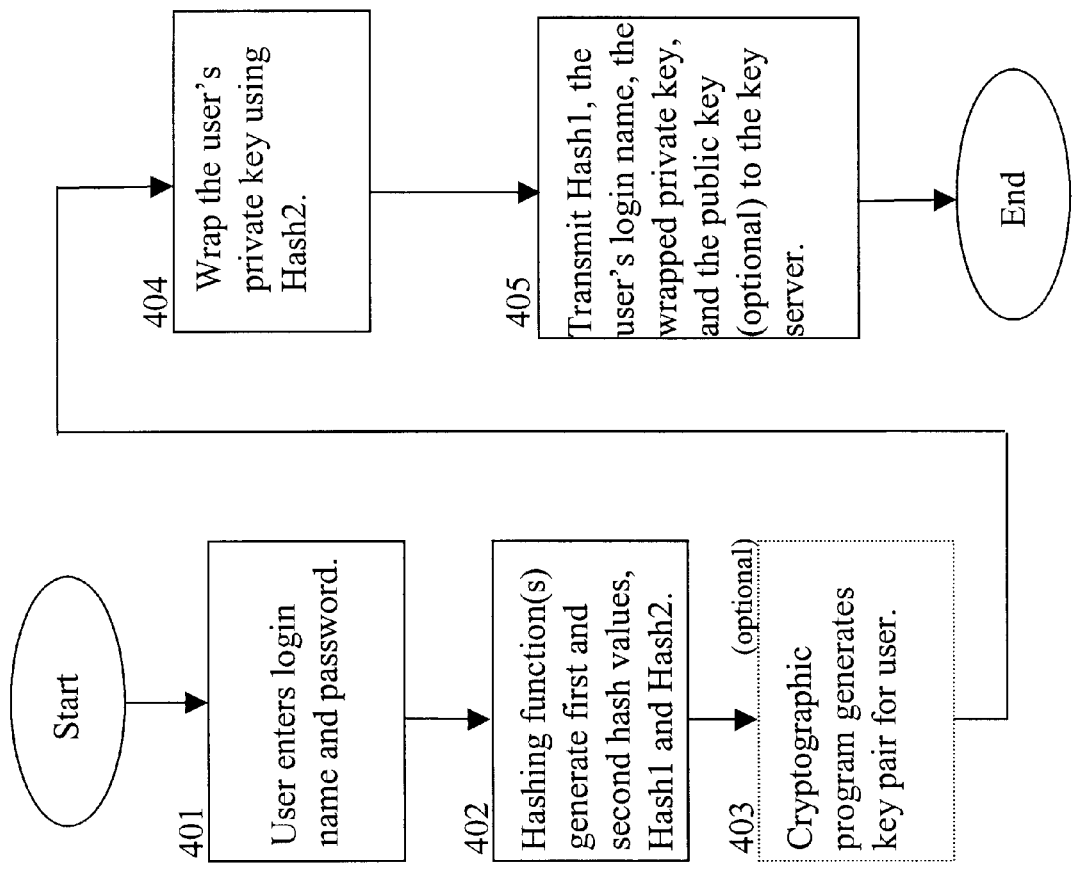

The pre-generation of table 250 at key server 101 will now be described in more detail with reference to FIG. 4. The user registers a private key/public key pair with key server 101 by first entering a login name and password. (Act 401). Hash1 and Hash2 are then generated as described above in Act 302. (Act 402). If the user does not have a public key/private key pair, cryptographic program 130 generates these keys for the user, (Act 403), and encrypts the user's private key with a symmetric encryption algorithm, using Hash2 or a value derived from Hash2 as the key for the symmetric encryption algorithm. (Act 404). As discussed above, encrypting a private key using a symmetric encryption algorithm is commonly referred to as "wrapping" the private key. The symmetric encryption algorithm may be, for example, the well known Triple DES algorithm. The key used to wrap the user's private key is preferably at least 100 bits in length.

After wrapping the private key, cryptographic program 130 transmits Hash1, the user's login name (e.g., "DrSmith"), the wrapped private key, and the public key (optional) to key server cryptographic program 150. (Act 405). Cryptographic program 150 receives this information and, in response, creates a new entry for the user, storing the user's login name, the user's first hash value (Hash1), the user's wrapped private key, and the user's public key (optional).

As described above, a private key can be securely distributed from a key server to multiple client computer systems after the user of client computer is authenticated. The distribution does not require the user to carry any special hardware devices and only requires a single password. Because the private key is not permanently stored at the client computers, even if an unauthorized user has access to the client computers, they are not likely to be able to obtain the private key. Similarly, because the key server only has access to an encrypted version of the private key, and because the key server does not store the user's password, the key server, even if broken in to, is not likely to compromise the user's private key.

In a variation of the above procedure, the hash function Hash2 could be replaced by the identity function. In other words, the cryptographic program 130 would wrap the private key with the password of the user, instead of wrapping the private key with a cryptographic hash of the password. This would have an advantage of being faster, but would not protect the password as well if an adversary was able to somehow obtain the wrapped private key.

One application in which the present invention is particularly suited for is to provide digital signature capability to professionals that travel or to deliver confidential information from a variety of internet web sites to professionals that travel. For example, a doctor may wish to access confidential patient information, modify patient information, or digitally sign messages from multiple computer terminals, such as terminals in each of many clinics that she visits. Alternatively, consumers may wish to store and securely access private financial or medical information at a central database. In general, as one of ordinary skill in the art will recognize, virtually any application requiring the transfer of a private key over an insecure network may be implemented using the above discussed concepts that are consistent with the present invention.

A useful variation of the above techniques is to have the private key of the user only stay on the client computer for a limited amount of time. If the private key is a digital signature key, this can be accomplished in the following manner. The cryptographic program 130 generates a new temporary private key and public key. After the cryptographic program 130 has obtained the wrapped user private key from the key server 101, and has unwrapped the user's private key, the cryptographic program 130 signs the new temporary public key with the user's private key. Then the user's private key is removed from memory, and the new temporary private key is used to sign any messages that the cryptographic program 130 needs to sign. When the cryptographic program 130 sends a signed message to content server/relying party 102, the cryptographic program 130 includes the new temporary public key, signed with the user's private key. Although it is not required, the signature of the new temporary public key with the user's private key could involve the cryptographic program 130 first forming a certificate with the new temporary public key and then having the user's private key sign the certificate. Another variation of this would be for the cryptographic program 130 to send the signature of the new temporary public key with the user's private key to a certification authority. The certification authority would check the signature of the user's private key, and if valid, would issue a certificate for the new temporary public key that would only be valid for a short amount of time.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of securely communicating a private key of a cryptographic key pair from a remote server to a client computer over a network comprising:
   receiving a login name and a password from a user;
   applying a first hashing function to the password and a first random number stored on the client computer to produce a first hash value;
   applying a second hashing function to the password and a second random number stored on the client computer to produce a second hash value, the first random number being different than the second random number;
   sending the login name and the first hash value to the remote server;
   receiving an encrypted private key from the remote server in response, the private key being encrypted using a symmetric encryption process; and
   decrypting the received encrypted private key using the second hash value as a symmetric key.

2. The method of claim 1, wherein the first hashing function and the second hashing function are the same.

3. The method of claim 1, wherein the first hashing function and the second hashing function are different.

4. The method of claim 1, further comprising repeating the application of the first and second hashing functions a selected plurality of times to produce the hash values.

5. The method of claim 1, wherein applying the first hash function comprises applying the first hash function to the login name in addition to the password and the first random number.

6. The method of claim 1, wherein applying the second hash function comprises applying the second hash function to the login name in addition to the password and the second random number.

7. The method of claim 1, further comprising using the private key on the client computer system, and deleting the private key from the client computer system after use.

8. An article comprising: a computer-readable medium storing instructions, that when executed by a processor, cause the secure communication of a private key of a cryptographic key pair from a remote server to a client computer over a network by
   receiving a login name and a password from a user;
   applying a first hashing function to the password and a first random number stored on the client computer to produce a first hash value;
   applying a second hashing function to the password and a second random number stored on the client computer to produce a second hash value, the first random number and the second random number being different fixed random numbers;
   sending the login name and the first hash value to the remote server;
   receiving an encrypted private key from the remote server in response, the private key being encrypted using a symmetric encryption process; and
   decrypting the received encrypted private key using the second hash value as a symmetric key.

9. The article of claim 8, wherein the first hashing function and the second hashing function are the same.

10. The article of claim 8, wherein the first hashing function and the second hashing function are different.

11. The article of claim 8, further comprising repeating the application of the first and second hashing functions a selected plurality of times to produce the hash values.

12. The article of claim 8, wherein instructions for applying the first hash function comprise instructions for applying the first hash function to the login name in addition to the password and the first random number.

13. The article of claim 8, wherein instructions for applying the second hash function comprise instructions for applying the second hash function to the login name in addition to the password and the second random number.

14. The article of claim 8, further comprising instructions for using the private key on the client computer system, and deleting the private key from the client computer system after use.

15. A client computer system comprising:
    a processor; and
    a memory coupled to the processor, the memory storing
    a first random number;
    a second random number, the first random number and the second random number being different fixed random numbers;
    a first hashing function to produce a first hash value based at least in part on a password received from a user and the first random number, and to send the first hash value and a user's login name to a remote server;
    a second hashing function to produce a second hash value based at least in part on the password and the second random number; and
    a decryption function to receive an encrypted private key from a remote server in response to the sending of the first hash value and the user's login name, and to decrypt the received encrypted private key using the second hash value as a symmetric key.

16. The client computer system of claim 15, wherein the first hashing function and the second hashing function are the same.

17. The client computer system of claim 15, wherein the first hashing function and the second hashing function are different.

18. The client computer system of claim 15, wherein the first hash function applies the first hash function to the user's login name in addition to the password and the first random number.

19. The client computer system of claim 15, wherein the second hash function applies the second hash function to the user's login name in addition to the password and the second random number.

20. A method comprising:
    receiving a user's login name and a password;
    applying a first hashing function to the password and a first random number to produce a first hash value;
    applying a second hashing function to the password and a second random number to produce a second hash value, the first random number and the second random number being different fixed random numbers;
    encrypting a private key of a cryptographic key pair associated with the user using the second hash value as a symmetric key; and
    storing the user's login name, the first hash value, and the encrypted private key in an entry in a data structure.

21. The method of claim 20, further comprising:
    receiving the user's login name and the first hash value from a client computer system;
    determining if the received login name and received first hash value match an entry in the data structure; and
    sending the encrypted private key from the entry to the client computer system when the received login name and received first hash value match the entry.

22. The method of claim 20, further comprising generating the cryptographic key pair associated with the user prior to encrypting the private key.

23. An article comprising: a computer-readable medium storing instructions, that when executed by a processor, cause
receiving a user's login name and a password;
applying a first hashing function to the password and a first random number to produce a first hash value;
applying a second hashing function to the password and a second random number to produce a second hash value, the first random number and the second random number being different fixed random numbers;
encrypting a private key of a cryptographic key pair associated with the user using the second hash value as a symmetric key; and
storing the user's login name, the first hash value, and the encrypted private key in an entry in a data structure.

24. The article of claim 23, further comprising instructions for
receiving the user's login name and the first hash value from a client computer system;
determining if the received login name and received first hash value match an entry in the data structure; and
sending the encrypted private key from the entry to the client computer system when the received login name and received first hash value match the entry.

25. The article of claim 23, further comprising instructions for generating the cryptographic key pair associated with the user prior to encrypting the private key.

26. A server system comprising:
a data structure storing a plurality of entries, each entry including a user login name, a first hash value, and an encrypted private key; and
a cryptographic component coupled to the data structure, to generate the first hash value by applying a first hash function to a user's password corresponding to the user login name and a first random number, to generate a second hash value by applying a second hash function to the user's password and a second random number, the first random number and the second random number being different fixed random numbers, to encrypt a private key of a cryptographic key pair for the user using a second hash value as a symmetric key, to store the user login name, the first hash value, and the encrypted private key in an entry in the data structure, to receive a request to retrieve the encrypted private key from a client computer system, the request including the user login name and the first hash value, to compare the received user login name and the received first hash value to entries in the data structure, and to send the encrypted private key to the client computer system from an entry in the data structure when the received user login name and the received first hash value match the user login name and first hash value of the entry.

27. The server system of claim 26, wherein the first hashing function and the second hashing function are the same.

28. The server system of claim 26, wherein the first hashing function and the second hashing function are different.

29. The server system of claim 26, wherein the cryptographic component applies the first and second hashing functions a selected plurality of times to produce the hash values.

30. The server system of claim 26, wherein the cryptographic component applies the first hash function to the login name in addition to the user's password and the first hash value.

31. The server system of claim 26, wherein the cryptographic component applies the second hash function to the user's login name in addition to the password and the second hash value.

32. A system comprising:
a remote server including
a data structure storing a plurality of entries, each entry including a user login name, a first hash value, and an encrypted private key; and
a cryptographic component coupled to the data structure, to generate the first hash value by applying a first hash function to a user's password corresponding to the user login name and a first random number, to generate a second hash value by applying a second hash function to the user's password and a second random number, the first random number and the second random number being different fixed random numbers, to encrypt a private key of a cryptographic key pair for the user using the second hash value as a symmetric key, to store the user login name, the first hash value, and the encrypted private key in an entry in the data structure, to receive a request to retrieve the encrypted private key, the request including the user login name and the first hash value, to compare the received user login name and the received first hash value to entries in the data structure, and to send the encrypted private key from an entry in the data structure when the received user login name and the received first hash value match the user login name and first hash value of the entry; and
a plurality of client computer systems coupled to the remote server, each of the client computer systems including
a processor; and
a memory coupled to the processor, the memory storing
the first random number;
the second random number;
the first hashing function to produce the first hash value based at least in part on a password received from the user and the first random number, and to send the first hash value and the user's login name to the remote server;
the second hashing function to produce the second hash value based at least in part on the password and the second random number; and
a decryption function to receive the encrypted private key from the remote server in response to the sending of the first hash value and the user's login name, and to decrypt the received encrypted private key using the second hash value as a symmetric key.

* * * * *